US008116775B2

(12) United States Patent
Choi et al.

(10) Patent No.: US 8,116,775 B2
(45) Date of Patent: Feb. 14, 2012

(54) SYSTEM AND METHOD OF PROVIDING USER EQUIPMENT INITIATED AND ASSISTED BACKWARD HANDOVER IN HETEROGENEOUS WIRELESS NETWORKS

(75) Inventors: Sung-Ho Choi, Suwon-si (KR); O-Sok Song, Suwon-si (KR); Rajavelsamy Rajadurai, Bangalore (IN)

(73) Assignee: Samsung Electronics Co., Ltd, Suwon-si (KR)

( * ) Notice: Subject to any disclaimer, the term of this patent is extended or adjusted under 35 U.S.C. 154(b) by 99 days.

(21) Appl. No.: 12/443,564

(22) PCT Filed: Sep. 20, 2007

(86) PCT No.: PCT/KR2007/004600
§ 371 (c)(1),
(2), (4) Date: Apr. 2, 2010

(87) PCT Pub. No.: WO2008/038949
PCT Pub. Date: Apr. 3, 2008

(65) Prior Publication Data
US 2010/0190500 A1     Jul. 29, 2010

(30) Foreign Application Priority Data

Sep. 28, 2006   (IN) ............................ 1800/CHE/2006

(51) Int. Cl.
*H04W 36/00* (2009.01)

(52) U.S. Cl. ......... 455/437; 455/436; 455/438; 455/439

(58) Field of Classification Search ........... 455/436–444
See application file for complete search history.

(56) References Cited

U.S. PATENT DOCUMENTS

| | | | |
|---|---|---|---|
| 6,125,106 A * | 9/2000 | Ostrup et al. ................. | 370/230 |
| 6,771,694 B1 * | 8/2004 | Baumgartner ................ | 375/220 |
| 6,996,079 B1 * | 2/2006 | Bergenwall et al. .......... | 370/331 |
| 7,096,020 B2 | 8/2006 | Choi et al. | |
| 7,764,964 B2 * | 7/2010 | Moon et al. ................... | 455/436 |
| 2003/0053431 A1 * | 3/2003 | Madour ........................ | 370/331 |
| 2003/0092444 A1 | 5/2003 | Sengodan et al. | |
| 2005/0113086 A1 * | 5/2005 | Wilson ....................... | 455/432.2 |
| 2006/0098598 A1 * | 5/2006 | Gallagher ..................... | 370/331 |
| 2006/0109818 A1 * | 5/2006 | Ramanna et al. ............. | 370/331 |
| 2006/0176853 A1 | 8/2006 | Liu et al. | |
| 2006/0221901 A1 * | 10/2006 | Yaqub et al. .................. | 370/331 |
| 2010/0003988 A1 * | 1/2010 | Buckley et al. ............... | 455/436 |

* cited by examiner

*Primary Examiner* — Marisol Figueroa
(74) *Attorney, Agent, or Firm* — Jefferson IP Law, LLP (57) ABSTRACT

The present invention relates to the field of mobility in heterogeneous wireless networks. In particular, the invention proposes a system and method of providing User Equipment (UE) initiated and assisted backward handover in the heterogeneous wireless networks. Depending on certain criteria, the UE may decide that if it needs a handover from a serving network to a target network. The UE initiates the backward handover by sending handover request message to the target network through the serving network. The serving network checks for the capabilities of the UE and authorizes the backward handover. The target network prepares for the backward handover and informs the UE when the target network is ready. The UE then starts the handover procedure.

18 Claims, 8 Drawing Sheets

SYSTEM AND METHOD OF PROVIDING USER EQUIPMENT INITIATED AND ASSISTED BACKWARD HANDOVER IN HETEROGENEOUS WIRELESS NETWORKS

FIELD OF INVENTION

The present invention in general relates to the field of Mobility. Further this invention relates to the filed of mobility in Heterogeneous access systems. Further more, this invention is related to the User Equipment (UE) initiated and assisted backward handovers, i.e., the present invention relates to method of UE preparing the target access system for handover through the serving access system. The present invention provides a method of preparing the target system for a seamless handover by the UE. The present invention encompasses method for UE preparing the target system through the serving access system for seamless handover. More particularly this invention relates to a system and method of providing user equipment initiated and assisted backward handover in heterogeneous wireless networks.

DESCRIPTION OF THE RELATED ART

The radio access network (RAN), system architecture (SA) and the core terminal (CT) working groups of the third generation partnership project (3GPP) aim to develop an enhanced UTRAN (E-UTRAN) architecture for next generation wireless systems. The E-UTRAN system is required to co-exist with the current second (2G) and third generation (3G) wireless systems, and in particular, support handovers between the existing systems and the newly evolved E-UTRAN system, specified in the 3GPP TR 23.882, 3GPP TS 23.401 and 3GPP TS 23.402.

Figure 1:
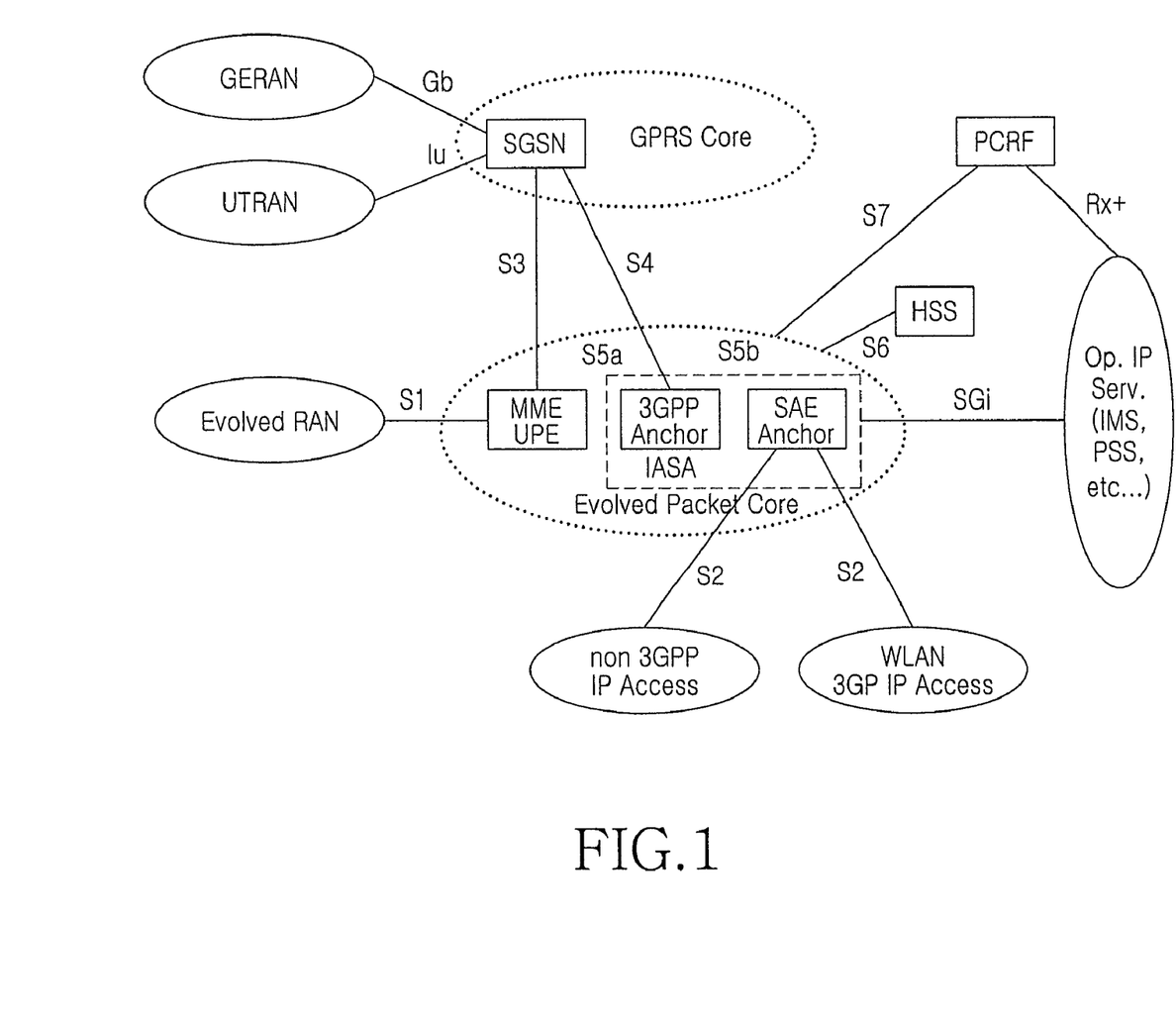
FIG. 1 illustrates Logical high level architecture for the evolved system

The E-UTRAN system is an evolution of the 3GPP UTRAN system, in which the main entities are the user equipment (UE), the enhanced Node B (ENB), Mobility Management Entity (MME), User Plane Entity (UPE) and Inter Access System Anchor (IASA) as shown in the FIG. 1. The ENB of the EUTRAN system is expected to have the features of the Node B and the radio network controller (RNC) of the legacy UTRAN system. MME of the System Architecture Evolution (SAE) manages and stores UE context (for idle state: UE/user identities, UE mobility state, user security parameters). It generates temporary identities and allocates them to UEs. It checks the authorization whether the UE may camp on the TA or on the PLMN. It also authenticates the user. UPE of SAE terminates for idle state UEs the downlink data path and triggers/initiates paging when downlink data arrive for the UE. It manages and stores UE contexts, e.g. parameters of the IP bearer service or network internal routing information. It performs replication of the user traffic in case of interception. Inter AS Anchor is the user plane anchor for mobility between different access systems. It performs or supports handover between different access systems.

The GERAN consists of the Base Transceiver Station (BTS) and the Base Station Controller (BSC). The UTRAN consists of the Node B and the Radio Network Controller (RNC). The GPRS Core Network consists of the Serving GPRS Support Node (SGSN) and the Gateway GPRS Support Node (GGSN) as shown in FIG. 1.

The integrated WLAN (I-WLAN) system specified in the 3GPP TS 23.234 specifications provides a system and method to integrate legacy UTRAN systems with WLAN systems, as shown in the FIG. 1. The I-WLAN system allows WLAN users to access 3GPP packet switched services (WLAN 3GPP IP Access).

Limitation

At present there is no efficient mechanism specified to provide Inter-RAT handover decision and preparation of the target system by the user equipment or the network entities of the serving network for seamless handover in the heterogeneous access systems namely between SAE, WiMAX, I-WLAN and UMTS.

SUMMARY OF THE INVENTION

The primary object of the invention is to provide a mechanism by which the UE decides the target access system based on the access system specific handover criteria and ranking configured in it.

It is another object of the invention, the UE initiate the handover request and prepare the target access system through the serving access system for a seamless handover.

It is another object of the invention, the inter-RAT handover decision is taken by the serving network entity through hierarchical manner starting from RAN network entity towards the core network entity based on the information on the handover criteria and ranking available in the network entity.

It is another object of the invention to illustrate the above invention.

The present invention is related to the scenario where a UE handover between heterogeneous access systems. The method of the invention comprises of a mechanism that provides the UE to make HO decision and prepares the target access system for a seamless handover through the serving access system.

The present invention provides a method to provide a mechanism by which the UE decides the target access system based on the access system specific handover criteria and ranking configured in it.

The present invention provides a method by which the UE initiate the handover request and prepare the target access system through the serving access system for a seamless handover.

The present invention provides a method by which the network entity in the serving network decides the Inter-RAT HO through hierarchical manner (starting from RAN network entity) based on the target access system specific handover criteria and ranking information present in it.

Accordingly the invention explains a method of providing user equipment initiated and assisted backward handover in heterogeneous wireless networks comprising the steps of:

deciding the need of a handover from a serving network to a target network by the UE;

initiating the backward handover by sending handover request message to the target network through the serving network by the UE;

checking for the capabilities of the UE and authorizing the backward handover by the serving network;

preparing for the backward handover and informing the UE when the target network is ready by the target network; and performing the handover procedure by the UE.

Accordingly the invention also explains a system for providing user equipment initiated and assisted backward handover in heterogeneous wireless networks comprising:

UE deciding the need of a handover from a serving network to a target network;

UE initiating the backward handover by sending handover request message to the target network through the serving network;

the serving network checking for the capabilities of the UE and authorizing the backward handover;

the target network preparing for the backward handover and informing the UE when the target network is ready; and
the UE performing the handover procedure.

The other objects, features and advantages of the present invention will be apparent from the accompanying drawings and the detailed description as follows.

DETAILED DESCRIPTION OF THE INVENTION

The preferred embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional details are not described in order not to unnecessarily obscure the present invention in detail.

The present invention provides a system and method of providing UE assisted backward handover in heterogeneous wireless networks.

Figure 2:
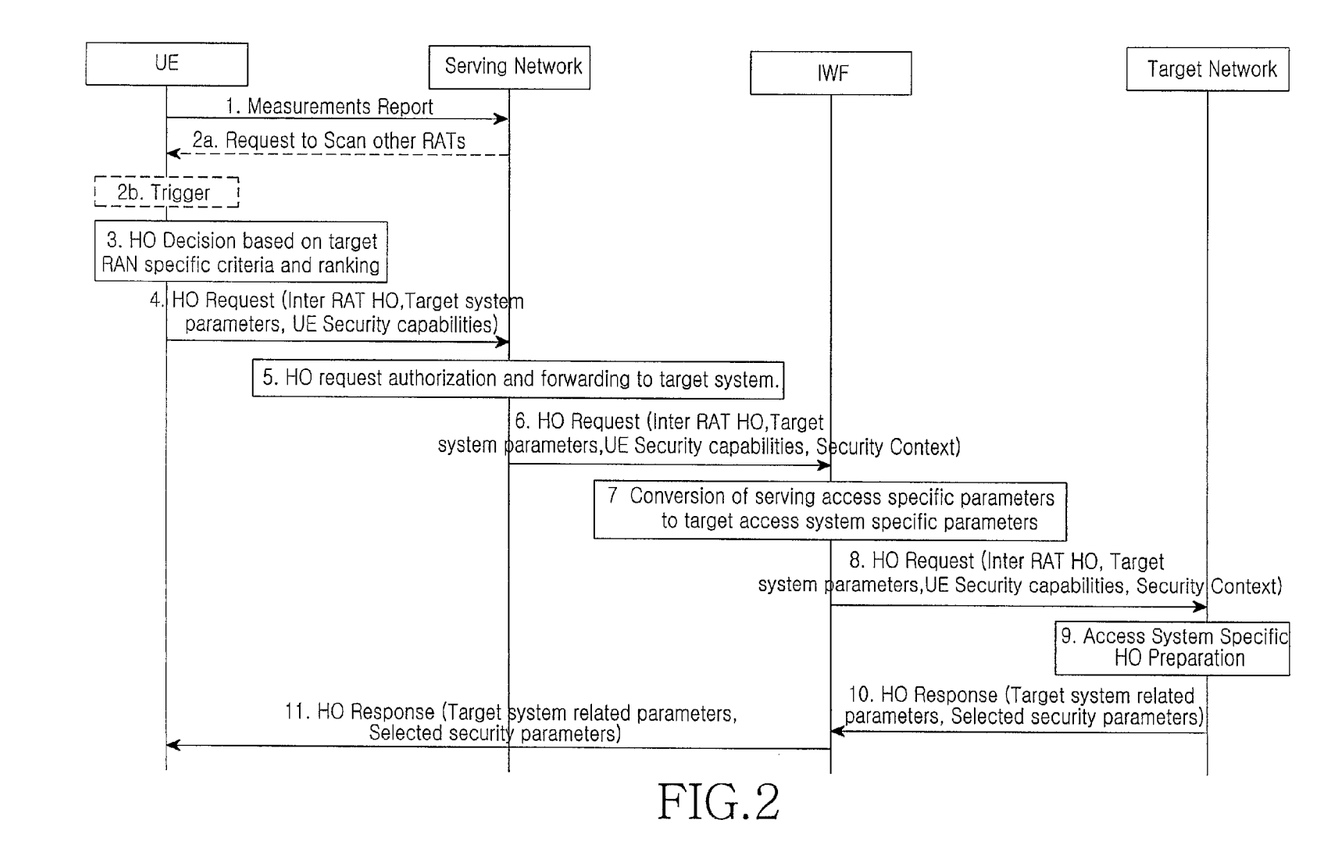
FIG. 2 illustrates Backward Handover between Heterogeneous access systems initiated by UE

The invention is operated as detailed below:

Backward Handover Between Heterogeneous Access Systems Initiated by UE:

The generalized UE assisted backward handover between the heterogeneous wireless networks is shown in FIG. 2. The functionality of the interworking function/unit (IWF/IWU) is to convert the RAN and the CN containers/protocol/parameters of one access system to another. IWF interface with different network entities, with the entity specific interface protocol. The IWF can be co-located with any other network entity in the serving network or in the target network or alternatively can be a separate entity in the serving network or in the target network. The operation of the UE assisted backward handover is given in details below:

UE sends periodic or event based measurements to the serving access network.

If the serving access system finds that UE measurement is below the threshold or serving access system decides by any other mean that serving RAT cannot be continued, then the serving access system can request the UE to start scanning other RATs or alternatively by L2 or by some other means, the UE decides that the serving RAN cannot be continued and starts scanning the other RATs.

UE decide the target system based on the measurement report compared with the RAT specific handover criteria and ranking orders configured in the UE.

The UE initiates the backward handover procedure by sending handover request message to the target network through the serving network.

The serving network checks for the capabilities and authorizes the UE requested handover.

Then the serving network forwards the HO request to the interworking function (IWF). The serving network includes the security context of the UE along with this message.

The IWF converts the serving access network specific parameters to the target specific parameters and forwards the request to the target network.

The IWF lookup the target system parameters in the HO request message and forwards the HO request to the appropriate target access system entity.

The target system then prepares for the UE handover using the HO request parameters.

After successful HO preparation the target system sends HO response message to the IWF. The target system includes the target system related parameters like entity ID and/or IP address and selected security configuration along with the HO response.

The IWF then converts the parameters according to the serving system specific parameters and forwards the HO response to the serving network. Then the UE initiate L2 connectivity to the target system.

Figure 3:
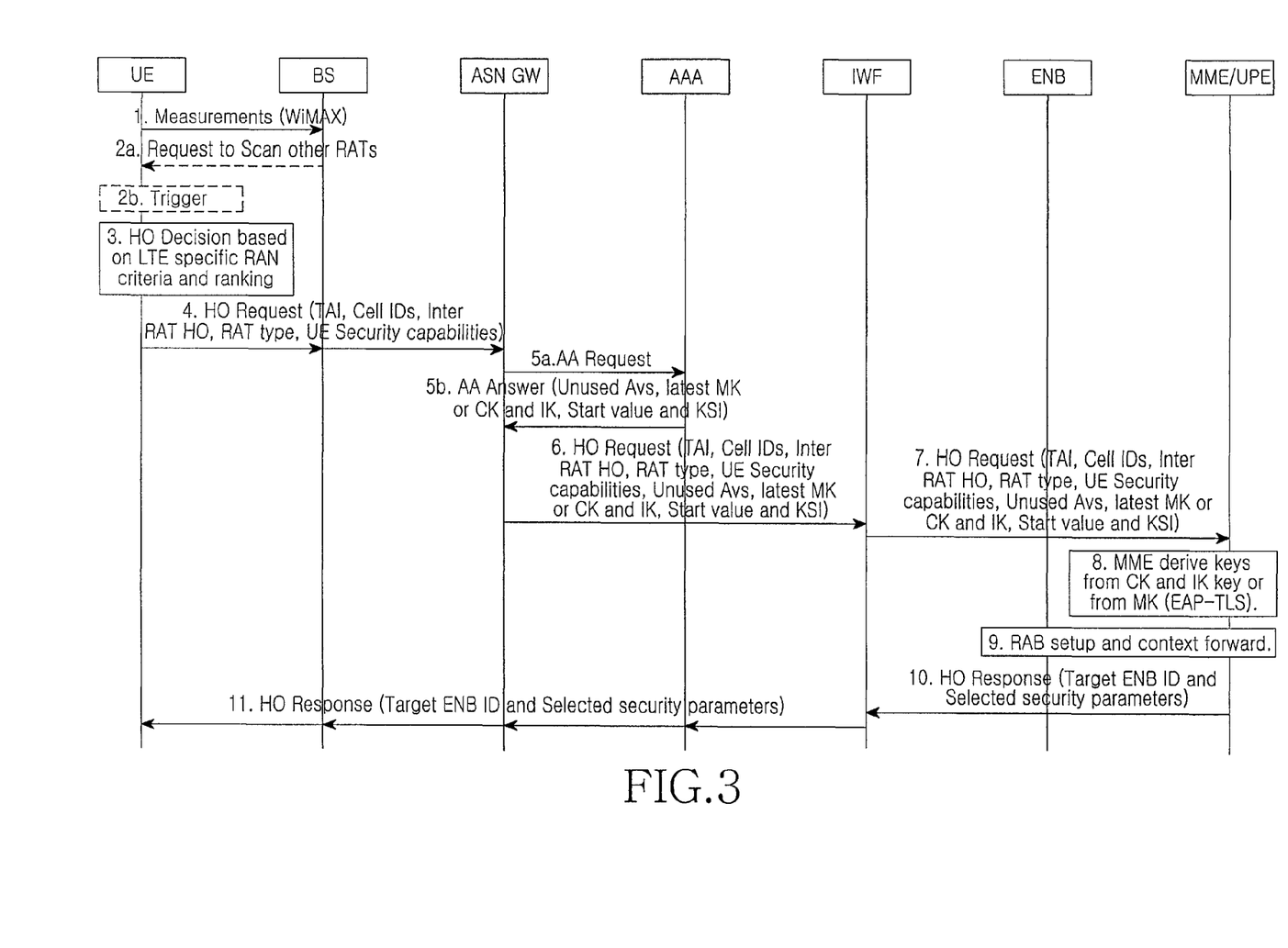
FIG. 3 illustrates Backward Handover from WiMAX to LTE/SAE access system initiated by UE (Alternative 1)

Illustrated Example for Backward Handover from the WiMAX to the LTE/SAE Access System as Shown in FIG. 3

UE sends periodic or event based measurements to the BS of WiMAX network.

If the BS finds that UE measurement is below the threshold or BS decides by any other mean that WiMAX RAN cannot be continued, then the BS can request the UE to start scanning other RATs or alternatively by L2 or by some other means, the UE decides that the serving RAN cannot be continued and starts scanning the other RATs.

UE decided the target system as LTE/SAE based on the LTE/SAE measurement report compared with the RAT specific handover criteria and ranking orders configured in the UE.

The UE initiates the backward handover procedure by sending handover request message to the LTE/SAE network through the WiMAX network. The UE includes the UE security capabilities, TAI, cell ID, Indiation of Inter RAT HO, serving and target RATs, etc. The UE send the HO request to the BS, and then the BS forwards the HO request to the ASN GW.

The ASN GW then contacts the AAA server for authorization. The AAA server checks in user's profile if inter RAT HO is allowed. If the user is capable of inter RAT handover, in authorization answer, the AAA server includes the unused AVs, latest CK and IK or alternatively the Master Key (MK).

The ASN GW forwards the HO request message along with the security keys given by AAA server to the IWF.

The IWF function then forwards the HO Request to the MME through the interface specific protocol. The IWF obtains the IP address of the MME by resolving TAI or alternatively the IWF have the mapping of TAI to the MME.

The MME decides the target ENB and derives the LTE/SAE specific keys and prepares for the UE HO. The MME derives the LTE/SAE specific key $K_{ASME}$ using the CK and IK or the Master Keys of the WiMAX network. The derivation of $K_{ASME}$ from CK and IK is by Concatenation of CK and IK or alternatively using the pseudo random function (PRF) and input to the PRF are CK and IK or alternatively Exclusive OR'ing the keys CK and IK or alternatively some other means using CK and IK or using MK. Then from $K_{ASME}$ all other keys are derived as specified in the 3GPP TR 33.821.

The MME passes the security context to the target ENB and setup the RAB for the UE. The MME sends the preferred algorithm as the algorithm used in the WiMAX system by the UE to the target ENB.

After successful HO preparation the MME sends HO response message to the IWF. The MME includes the target system related parameters like ENB ID(s) and selected security configuration parameters along with the HO response.

The IWF then converts the parameters according to the serving system specific parameters and forwards the HO response to the UE through AAA, ASN GW and BS. Then the UE initiate L2 connectivity to the ENB.

Figure 4:
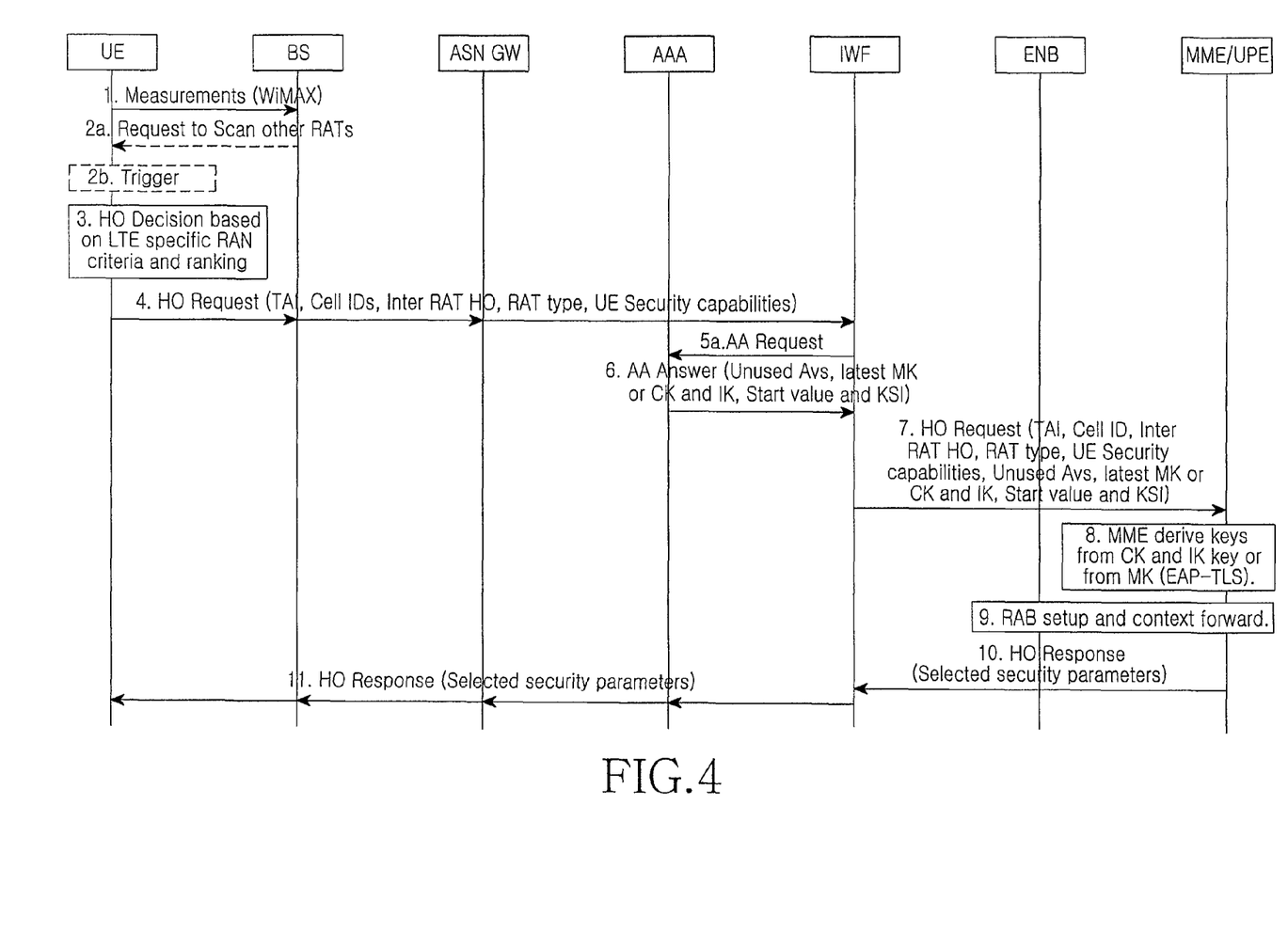
FIG. 4 illustrates Backward Handover from WiMAX to LTE/SAE access system initiated by UE (Alternative 2)

Illustrated Example for Backward Handover from the WiMAX to the LTE/SAE Access System as Shown in FIG. 4

UE sends periodic or event based measurements to the BS of WiMAX network.

If the BS finds that UE measurement is below the threshold or BS decides by any other mean that WiMAX RAN cannot be continued, then the BS can request the UE to start scanning other RATs or alternatively by L2 or by some other means, the UE decides that the serving RAN cannot be continued and starts scanning the other RATs.

UE decided the target system as LTE/SAE based on the LTE/SAE measurement report compared with the RAT specific handover criteria and ranking orders configured in the UE.

The UE initiates the backward handover procedure by sending handover request message to the LTE/SAE network through the WiMAX network. The UE includes the UE security capabilities, TAI, cell ID, indication of Inter RAT HO, serving and target RATs, etc. The UE send the HO request to the BS, and then the BS forwards the HO request to the ASN GW. The ASN GW forwards the HO request message to the IWF.

The IWF then contacts the AAA server for authorization through AA Request message.

The AAA server checks in user's profile if inter RAT HO is allowed. If the user is capable of inter RAT handover, in authorization answer message, the AAA server includes the unused AVs, latest CK and IK or alternatively the Master Key (MK).

The IWF forwards the HO request message along with the security keys given by AAA server to the MME. The IWF function then forwards the HO Request to the MME through the interface specific protocol. The IWF obtains the IP address of the MME by resolving TAI or alternatively the IWF have the mapping of TAI to the MME.

The MME decides the target ENB and derives the LTE/SAE specific keys and prepares for the UE HO. The MME derives the LTE/SAE specific key $K_{ASME}$ using the CK and IK or the Master Keys of the WiMAX network. The derivation of $K_{ASME}$ from CK and IK is by Concatenation of CK and IK or alternatively using the pseudo random function (PRF) and input to the PRF are CK and IK or alternatively using Exclusive OR function on the keys CK and IK or alternatively some other means using CK and IK or using MK. Then from $K_{ASME}$ all other keys are derived as specified in the 3GPP TR 33.821.

The MME passes the security context to the target ENB and setup the RAB for the UE. The MME sends the preferred algorithm as the algorithm used in the WiMAX system by the UE to the target ENB.

After successful HO preparation the MME sends HO response message to the IWF. The MME includes the target system related parameters like ENB ID(s) and selected security configuration parameters along with the HO response.

The IWF then converts the parameters according to the serving system specific parameters and forwards the HO response to the UE through ASN GW and BS. Then the UE initiate L2 connectivity to the ENB.

Figure 5:
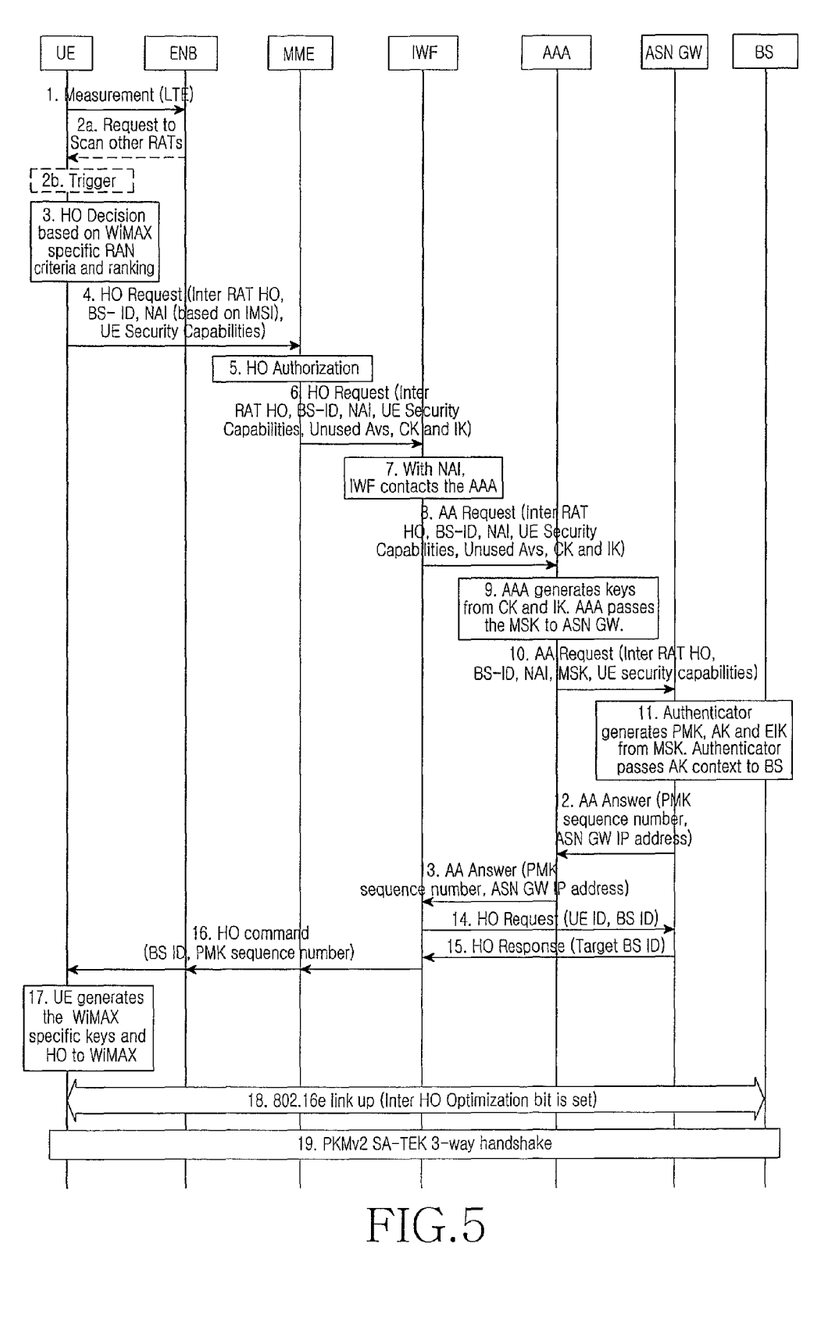
FIG. 5 illustrates Backward Handover from LTE/SAE to WiMAX access system initiated by UE (Alternative 1)

Illustrated Example for Backward Handover from the LTE/SAE to the WiMAX Access System as Shown in FIG. 5

UE sends periodic or event based measurements to the ENB of LTE access network.

If the ENB finds that UE measurement is below the threshold or ENB decides by any other mean that WiMAX RAN cannot be continued, then the ENB can request the UE to start scanning other RATs or alternatively by L2 or by some other means, the UE decides that the serving RAN cannot be continued and starts scanning the other RATs.

UE decided the target system as WiMAX based on the LTE/SAE measurement report compared with the RAT specific handover criteria and ranking orders configured in the UE.

The UE initiates the backward handover procedure by sending handover request message to the WiMAX network through the LTE/SAE network. The UE includes the UE security capabilities, BS ID, NAI (formaed based on IMSI), ASN ID, Indiation of Inter RAT HO, serving and target RATs, etc. The UE send the HO request to the ENB, and then the ENB forwards the HO request to the MME.

The MME checks in user's profile, if inter RAT HO is allowed for the UE.

If the user is capable of inter RAT handover, then the MME forwards the HO request message to the IWF. The MME includes the unused AVs, latest CK and IK along with the HO request message.

The IWF then contacts the AAA server for authorization and key derivation through the interface specific protocol. The IWF obtains the IP address of the AAA server by resolving NAI or alternatively the IWF have the mapping of NAI to the AAA server.

The IWF sends the AA Request message to the AAA server for authentication and authorization. The AA request message includes UE security capabilities, BS ID, NAI (formed based on IMSI), ASN ID, indication of Inter RAT HO, serving and target RATs, Unused AVs, etc., along with the security keys. The security key can be CK and IK derived from the $K_{ASME}$ or alternatively the MME sends $K_{ASME}$ as the security key.

The AAA server maps the target ASN GW based on the BS ID or alternatively by ASN ID or alternatively through some other means and derives the WiMAX specific keys. The WiMAX specific key Master Key (MK) are derived from the CK and IK keys received from the LTE/SAE system as specified in the IETF RFC 4187 (Extensible Authentication Protocol Method for 3rd Generation Authentication and Key Agreement (EAP-AKA)) or alternatively if $K_{ASME}$ is received from the LTE/SAE system then the AAA using $K_{ASME}$ as the MK. From Master Key the AAA server derives the following keys, Transient EAP Keys (TEKs), Master Session Key (MSK) and Extended Master Session Key (EMSK) as specified in the IETF RFC 4187 (Extensible Authentication Protocol Method for 3rd Generation Authentication and Key Agreement (EAP-AKA)).

The AAA server passes AA Response message along with the MSK key to the target ASN GW.

The ASN GW derives WiMAX specific keys from the MSK and passes the WiMAX specific keys and security context to the target BS. The ASN GW optionally setup the RAB for the UE.

After successful key derivation the ASN GW sends AA Answer message to the AAA server. The ASN GW includes the PMK sequence number along with the AA Answer message.

The AAA server forwards the message to the IWF.

The IWF sends the HO request Message to the ASN GW. The IWF includes the UE ID and the BS ID along with the other parameters in the message.

The ASN GW sends the HO response message with the target BS ID.

The IWF then converts the parameters according to the LTE/SAE specific parameters and sends the HO command to the UE through the MME and the ENB. The IWF includes the target BS ID, PMK sequence number.

The UE generates the WiMAX specific keys using the latest CK and IK keys agreed in the LTE/SAE system. The WiMAX specific key Master Key (MK) are derived from the CK and IK keys used in the LTE/SAE system as specified in the IETF RFC 4187 (Extensible Authentication Protocol Method for 3rd Generation Authentication and Key Agreement (EAP-AKA)) or alternatively if $K_{ASME}$ is used, then the UE using $K_{ASME}$ as the MK. From Master Key the UE derives the following keys, Transient EAP Keys (TEKs), Master Session Key (MSK) and Extended Master Session Key (EMSK) as specified in the IETF RFC 4187 (Extensible Authentication Protocol Method for 3rd Generation Authentication and Key Agreement (EAP-AKA)) and start handover procedure.

The UE does the 802.16e link up procedure. The UE set the HO Process optimization bit. Or alternatively the UE can indicate Inter HO optimization procedure by having a new bit. During the security capability exchange through the SBC_Req message, the UE can send the preferred algorithm as the algorithm used in the LTE/SAE system.

Then the WiMAX BS begins the PKMv2 three way handshake and establish the SA for link layer protection. The BS may accept the UE preferred algorithm, if it supports.

Figure 6:
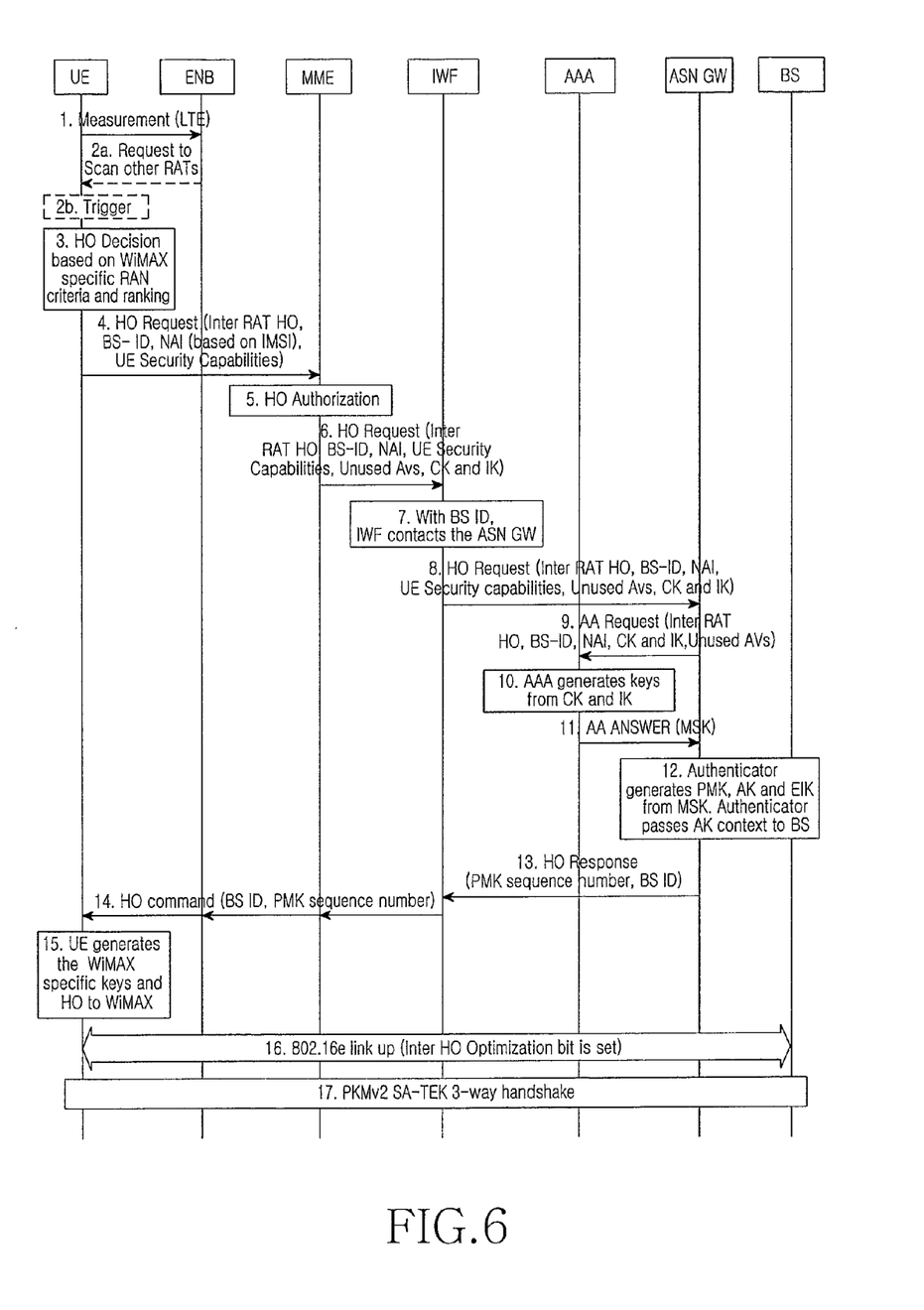
FIG. 6 illustrates Backward Handover from LTE/SAE to WiMAX access system initiated by UE (Alternative 2)
Figure 7:
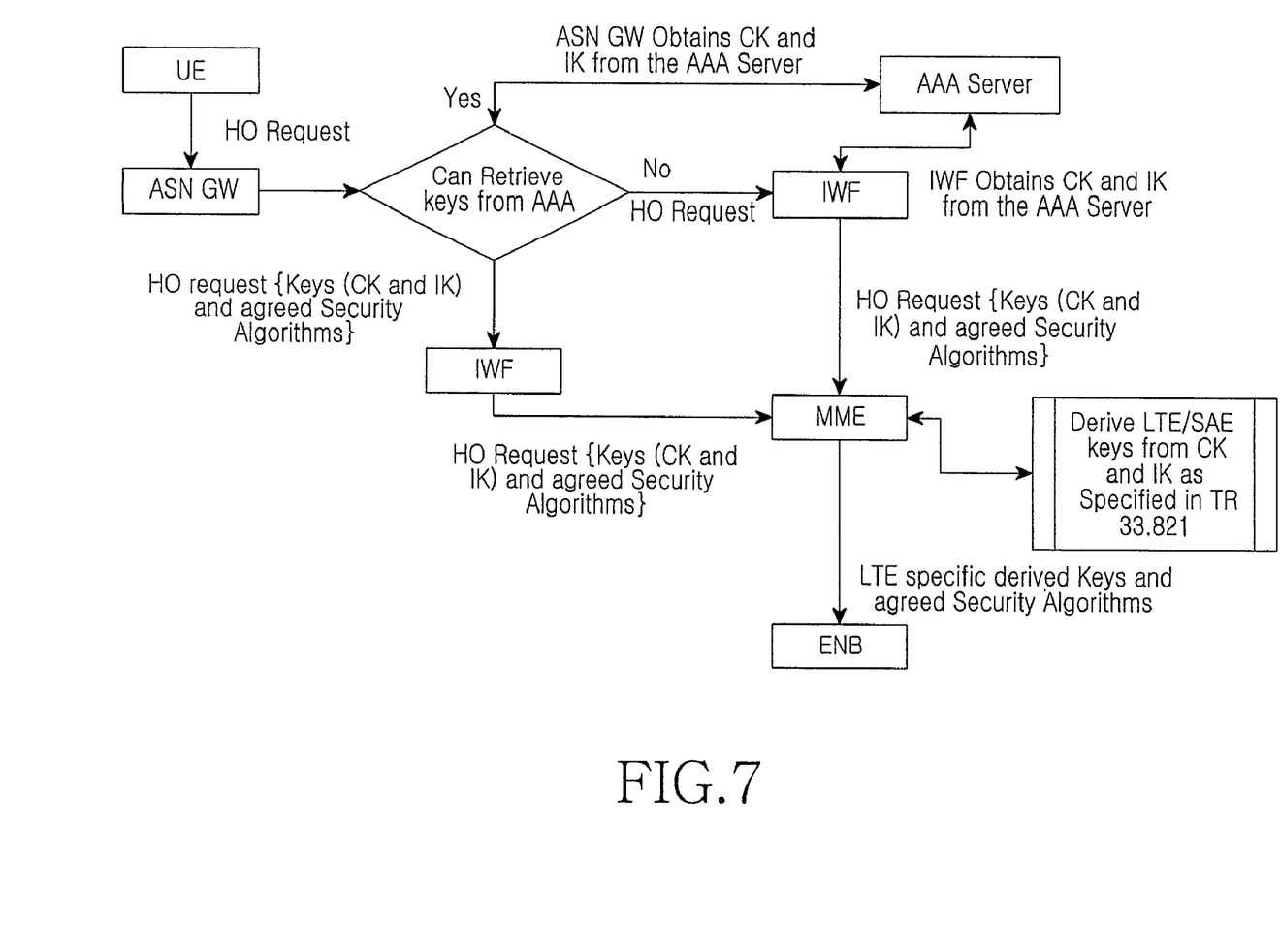
FIG. 7 illustrates the Flow Diagram for Backward Handover from WiMAX to LTE/SAE access system initiated by UE
Figure 8:
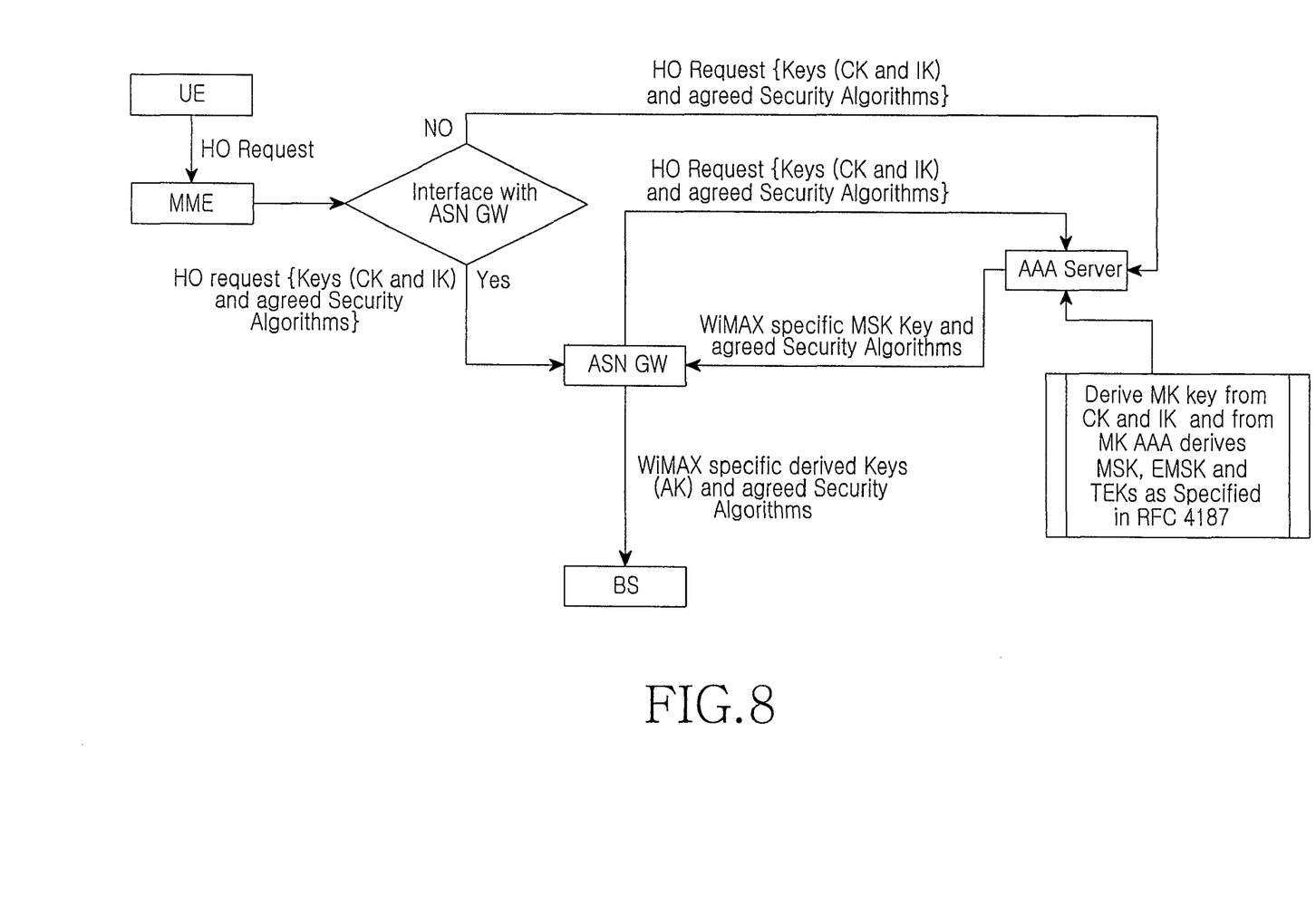
FIG. 8 illustrates the Flow Diagram for Backward Handover from LTE/SAE to LWiMAX access system initiated by UE

Illustrated Example for Backward Handover from the LTE/SAE to the WiMAX Access System as Shown in FIG. 6

UE sends periodic or event based measurements to the ENB of LTE access network.

If the ENB finds that UE measurement is below the threshold or ENB decides by any other mean that WiMAX RAN cannot be continued, then the ENB can request the UE to start scanning other RATs or alternatively by L2 or by some other means, the UE decides that the serving RAN cannot be continued and starts scanning the other RATs.

UE decided the target system as WiMAX based on the LTE/SAE measurement report compared with the RAT specific handover criteria and ranking orders configured in the UE.

The UE initiates the backward handover procedure by sending handover request message to the WiMAX network through the LTE/SAE network. The UE includes the UE security capabilities, BS ID, NAI (formaed based on IMSI), ASN ID, Indiation of Inter RAT HO, serving and target RATs, etc. The UE send the HO request to the ENB, and then the ENB forwards the HO request to the MME.

The MME checks in user's profile, if inter RAT HO is allowed for the UE.

If the user is capable of inter RAT handover, then the MME forwards the HO request message to the IWF. The MME includes the unused AVs, latest CK and IK along with the HO request message.

The IWF then contacts the ASN GW using the BS ID or through any other means.

The IWF sends the HO Request message to the ASN GW through the interface specific protocol. The HO request message includes UE security capabilities, BS ID, NAI (formaed based on IMSI), ASN ID, indication of Inter RAT HO, serving and target RATs, Unused AVs, etc., along with the security keys.

The ASN GW contacts the AAA server for authorization and key derivation. The ASN GW sends the AA Request message to the AAA server. The AA request message includes UE security capabilities, BS ID, NAI (formaed based on IMSI), ASN ID, indication of Inter RAT HO, serving and target RATs, Unused AVs, etc., along with the security keys. The security key can be CK and IK derived from the $K_{ASME}$ or alternatively the MME sends $K_{ASME}$ as the security key.

The AAA server checks for authorization and derives the WiMAX specific keys. The WiMAX specific key Master Key (MK) are derived from the CK and IK keys received from the LTE/SAE system as specified in the IETF RFC 4187 (Extensible Authentication Protocol Method for 3rd Generation Authentication and Key Agreement (EAP-AKA)) or alternatively if $K_{ASME}$ is received from the LTE/SAE system then the AAA using $K_{ASME}$ as the MK. From Master Key the AAA server derives the following keys, Transient EAP Keys (TEKs), Master Session Key (MSK) and Extended Master Session Key (EMSK) as specified in the IETF RFC 4187 (Extensible Authentication Protocol Method for 3rd Generation Authentication and Key Agreement (EAP-AKA)).

The AAA server passes AA Response message along with the MSK key to the ASN GW.

The ASN GW derives WiMAX specific keys from the MSK Key as specified in the WiMAX specification "WiMAX Forum Network Architecture—Stage 3—Detailed Protocols and Procedures—Release 1.0.0" and passes the WiMAX specific keys and security context to the target BS. The ASn GW optionally setup the RAB for the UE.

After successful key derivation the ASN GW sends HO Response message to the AAA server. The ASN GW includes the PMK sequence number and the target BS ID along with the HO Response message.

The IWF then converts the parameters according to the LTE/SAE specific parameters and sends the HO command to the UE through the MME and the ENB. The IWF includes the target BS ID, PMK sequence number.

The UE generates the WiMAX specific keys using the latest CK and IK keys agreed in the LTE/SAE system. The WiMAX specific key Master Key (MK) are derived from the CK and IK keys used in the LTE/SAE system as specified in the IETF RFC 4187 (Extensible Authentication Protocol Method for 3rd Generation Authentication and Key Agreement (EAP-AKA)) or alternatively if $K_{ASME}$ is used, then the UE using $K_{ASME}$ as the MK. From Master Key the UE derives the following keys, Transient EAP Keys (TEKs), Master Session Key (MSK) and Extended Master Session Key (EMSK) as specified in the IETF RFC 4187 (Extensible Authentication Protocol Method for 3rd Generation Authentication and Key Agreement (EAP-AKA)) and start handover procedure.

The UE does the 802.16e link up procedure. The UE set the HO Process optimization bit. Or alternatively the UE can indicate Inter HO optimization procedure by having a new bit. During the security capability exchange through the SBC_Req message, the UE can send the preferred algorithm as the algorithm used in the LTE/SAE system.

Then the WiMAX BS begins the PKMv2 three way handshake and establish the SA for link layer protection. The BS may accept the UE preferred algorithm, if it supports.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

GLOSSARY OF TERMS AND DEFINITIONS THEREOF

3GPP: 3rd Generation Partnership Project
3GPP2: 3rd Generation Partnership Project 2
AAA: Authentication, Authorization and Accounting
APN: Access Point Name
AS: Access System
ASN GW: Access Serving Network Gateway
AV: Authentication Vector
AuC: Authentication Center
Backward handover: The source RAN node initiates the handover, and resources are prepared in the target RAN Nodes. Examples of backward handover concept are reported in TR 25.931.
BTS: Base Transceiver Station
BSC: Base Station Controller
CK: Cipher Key
ENB: Evolving Node B
Forward handover: The UE changes to the target RAN node without any preparation in the network. Examples of this concept are reported in TR 25.931
GERAN: GSN EDGE Radio Access Network consisting of the BTS and BSC
GGSN: Gateway GPRS Support Node
GPRS: Generalized Packet Radio Services
HA: Home Agent, a router on a mobile node's home network that tunnels packets to the mobile node while it is away from home.
HLR: Home Location Register
HO: Handover
HSS: Home Subscription Server
IMS: IP Multimedia Service
IK: Integrity Key
IP: Internet Protocol
IP Sec: Internet Protocol Security
Inter AS MM: Inter Access System Mobility Manager, an entity assisting in mobility across access systems
IWF/IWU: Interworking Function or Interworking Unit. IWF and IWU are same and interchangeable.
L2: Layer 2
L3: Layer 3
LTE: Long Term Evolution
MIP: Mobile Internet Protocol includes version 4 and version 6
MME: Mobility Management Entity
MSC: Mobile Switching Center
NAI: Network Address Identifier;
Node B: The base station in a UMTS network
PCF: Packet Control Function
PCRF: Policy and Charging Rules Function
PDP: Packet Data Protocol
PDSN: Packet Data Serving Node
PRF: pseudo-random function
QoS: Quality of Service
RAT: Radio Access Technology
RNC: Radio Network Controller
RO: Route Optimization (in MIP)
RRC: Radio Resource Control
SAE: System Architecture Evolution
SGSN: Serving GPRS Support Node
UE: User Equipment
UMTS: Universal Mobile Telecommunication System
UPE: User Plane Entity
User terminal: the end user equipment e.g., the Mobile Station (MS) or User Equipment (UE).
UTRAN: UMTS Terrestrial Radio Access Network consisting of the Node B and the RNC.

We claim:

1. A method of providing user equipment (UE) with backward handover in heterogeneous wireless networks comprising the steps of:
    deciding the need of a handover from a serving network to a target network by the UE;
    initiating the backward handover by sending a handover request message to the target network through the serving network by the UE;
    checking capabilities of the UE and authorizing the backward handover by the serving network;
    preparing for the backward handover and informing the UE when preparation of the backward handover is completed by the target network; and
    performing handover procedure by the UE,
    wherein the authorizing of the backward handover comprises including a cipher key and an integrity key along with the handover request message and sending the handover request message including the cipher key and the integrity key, and
    wherein the preparing for the backward handover comprises generating target network specific keys from the cipher key and the integrity key.

2. The method as claimed in claim 1, wherein an interworking function (IWF) converts a Radio Access Network (RAN) and a Core Network (CN) containers/protocol/parameters of the serving system to containers/protocol/parameters of the target system.

3. The method as claimed in claim 2, wherein the IWF interfaces with different network entities and with the entity specific interface protocol.

4. The method as claimed in claim 2, wherein the IWF is co-located with any other network entity in the serving network or in the target network or alternatively can be a separate entity in the serving network or in the target network.

5. The method as claimed in claim 1, wherein the UE sends periodic or event based measurement report to the serving access network.

6. The method as claimed in claim 1, wherein if the serving network finds that UE measurement is below a threshold or the serving network decides that a serving Radio Access Technology (RAT) cannot be continued, the serving network can request the UE to start scanning other RATs.

7. The method as claimed in claim 5, wherein the UE decides the target network based on the measurement report compared with the target network specific handover criteria and ranking orders configured in the UE.

8. The method as claimed in claim 2, wherein the serving network forwards the handover request message to the IWF where the serving network includes security context of the UE along with the handover request message.

9. The method as claimed in claim 2, wherein the IWF converts the serving network specific parameters to the target network specific parameters and forwards the handover request message to the target network.

10. The method as claimed in claim 2, wherein the IWF lookup the target network specific parameters in the handover request message and forwards the handover request message to the target network.

11. The method as claimed in claim 10, wherein after the target network generates the target network specific keys, the target network sends a handover response message including the target network specific keys to the IWF.

12. The method as claimed in claim 11, wherein the target network includes the target network related parameters comprising entity ID and/or IP address, and selected security configuration along with the handover response message.

13. The method as claimed in claim 12, wherein the IWF converts the target network related parameters according to serving network specific parameters and forwards the handover response message to the serving network and then the UE initiate L2 connectivity to the target network.

14. The method of claim 1,
wherein the serving network comprises one of Long Term Evolution (LTE) access system and Worldwide Interoperability for Microwave Access (WiMAX) access system, and
wherein the target network comprises one of the Long Term Evolution (LTE) access system and the Worldwide Interoperability for Microwave Access (WiMAX) access system different than that of the serving network.

15. A system for providing user equipment (UE) backward handover in heterogeneous wireless networks comprising:
a UE for deciding the need of a handover from a serving network to a target network for initiating the backward handover by sending a handover request message to the target network through the serving network, and for performing handover procedure;
the serving network for checking capabilities of the UE and authorizing the backward handover; and
the target network for preparing the backward handover and informing the UE when preparation of the backward handover is completed,
wherein, for authorizing of the backward handover, the serving network includes a cipher key and an integrity key along with the handover request message and sends the handover request message including the cipher key and the integrity key, and
wherein, for preparing for the backward handover, the target network generates target network specific keys from the cipher key and the integrity key.

16. The system of claim 15,
wherein the serving network comprises one of Long Term Evolution (LTE) access system and Worldwide Interoperability for Microwave Access (WiMAX) access system, and
wherein the target network comprises one of the Long Term Evolution (LTE) access system and the Worldwide Interoperability for Microwave Access (WiMAX) access system different than that of the serving network.

17. A method of providing user equipment (UE) backward handover in heterogeneous wireless networks comprising the steps of:
receiving a handover request message from the UE deciding a handover from a serving network to a target network by a serving network;
checking capabilities of the UE, including a cipher key and an integrity key along with the handover request message and sending the handover request message including the cipher key and the integrity key to the target network by the serving network; and
preparing for a backward handover by generating target network specific keys from the cipher key and the integrity key and informing the UE when the backward handover is completed by the target network.

18. A system for providing user equipment (UE) backward handover in heterogeneous wireless networks comprising:
a serving network for receiving a handover request message from the UE deciding a handover from a serving network to a target network, for checking capabilities of the UE, for including a cipher key and an integrity key along with the handover request message and for sending the handover request message including the cipher key and the integrity key to the target network; and
the target network for generating target network specific keys from the cipher key and the integrity key and for informing the UE when preparation of the backward handover is completed.

* * * * *